United States Patent [19]
Handwerker

[11] Patent Number: 5,363,605
[45] Date of Patent: Nov. 15, 1994

[54] COVER FOR PILES OF PARTICULATE MATTER

[76] Inventor: Gary Handwerker, 2311 Burr Oak Rd., Northfield, Ill. 60093

[21] Appl. No.: 74,916

[22] Filed: Jun. 10, 1993

[51] Int. Cl.⁵ ............................................... E04D 1/34
[52] U.S. Cl. ................................................... 52/3
[58] Field of Search .......................................... 52/3–5

[56] References Cited

U.S. PATENT DOCUMENTS 1,871,571  8/1932  Weber .................................... 52/3
4,413,029  11/1983  Handwerker ............................ 52/3

Primary Examiner—James L. Ridgill, Jr.

[57] ABSTRACT

A protective cover for particulate material consisting of a plurality of panels, with each of a desired number of panels including an attachment strip attached to and extending along a portion of the length of the panel. A segment of the attachment strip is detached from the underlying panel to form an attachment loop for attachment of a ballast weight. As the size and shape of the pile changes, an additional segment of the attachment strip may be separated from the underlying panel to form another attachment loop to alter the altitude at which the weight is attached to the cover. A number of the panels include ripstops spaced at desired intervals along the panel to halt the propagation of rips which may form in the panel when the cover is subjected to stress forces.

18 Claims, 2 Drawing Sheets

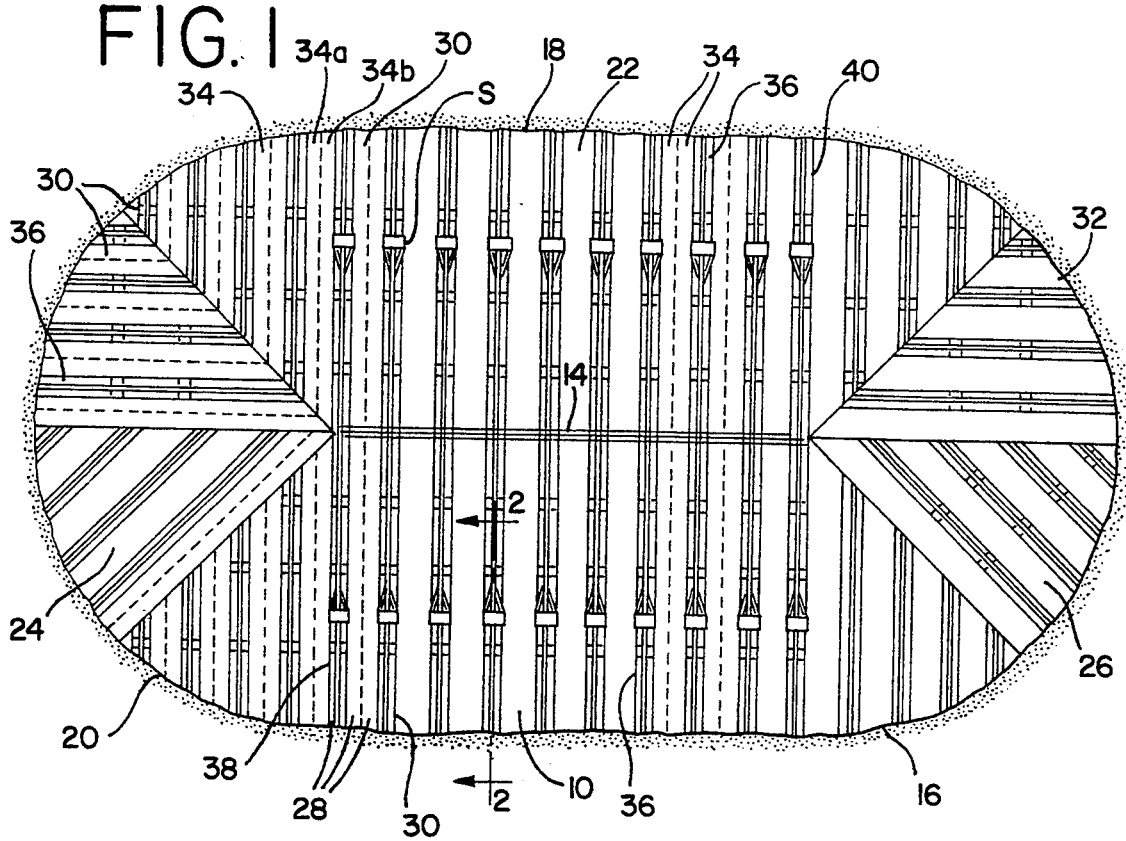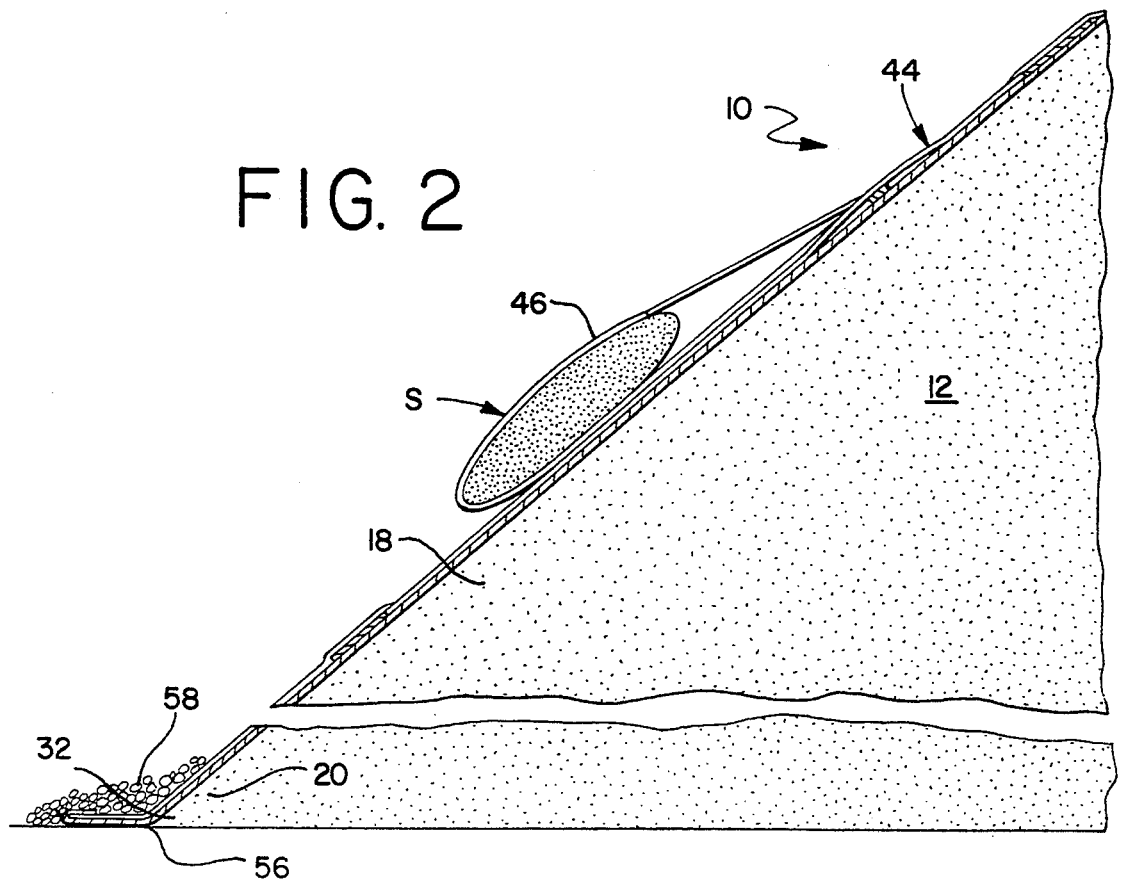

5,363,605

COVER FOR PILES OF PARTICULATE MATTER

FIELD OF THE INVENTION

This invention relates to covers for protecting quantities of material in outside storage, and more particularly relates to covers for protecting piles of particulate material in outside storage, which employ a multi-panel construction utilizing ripstops and adjustable attachment strips for the attachment of ballast weights at desired locations on the cover.

BACKGROUND OF THE INVENTION

Various types of protective covers have been developed for covering piles or mounds of particulate material, such as salt, sand, grain and the like, from the effects of the weather while the material is in outside storage. An example of a cover for protecting a large quantity of particulate material from the elements when stored outside in an otherwise unprotected condition is disclosed in Handwerker U.S. Pat. No. 4,413,029. Alternately, covers comprising all porous or all non-porous materials can be utilized.

While the cover disclosed in the Handwerker patent is capable of protecting the pile or mound of material covered thereby, it possessed a number of shortcomings. For example, in order to counteract the effects of aerodynamic lift exerted on the cover by the wind, a large number of ballast weights, such as automobile tires, were attached to the cover at fixed attachment points so that the ballast weights rested on the cover between the top or apex and the lower margin of the pile. However, if the pile had an atypical size or shape or as particulate matter was removed from the pile and the height of the pile diminished, the fixed attachment points ended up so close to the ground that the ballast weights rested on the ground which reduced or eliminated the effectiveness of the weights in maintaining the cover on the pile.

The wind may also enter beneath the cover through a removal opening or otherwise get beneath the cover and exert tensile forces on the cover. The prior Handwerker cover included canvas panels which were porous to gas which allowed the cover to breathe and reduce the stress exerted by the wind on the cover. In addition, the canvas material would form rips if the stress became too great. However, once a canvas panel formed a rip, the rip had a tendency to propagate and extend the entire length of the panel, resulting in a substantial cost to repair the rip. Such ripping may also occur in polyethylene panels of a cover under certain stress conditions.

Thus there is a need for a cover for a pile of particulate material which protects the pile from the elements and resists the effects of wind on the cover. A related need is for a cover which allows for the attachment of ballast weights at desired locations on the cover and also allows for each ballast attachment point to be shifted to compensate for changes in the shape and height of the pile.

There is a further need for a cover for a pile of particulate material which prevents rips which may form in the panels compromising the cover from propagating for more than a desired short length that is easy to repair.

SUMMARY OF THE INVENTION

Accordingly, the present invention provides a protective cover for particulate material consisting of porous panels, nonporous panels, or of alternating porous and nonporous panels, with each of a desired number of panels including an attachment strip attached to and extending along a portion of the panel. A segment of the attachment strip is detached from the underlying panel to form an attachment loop for securing a ballast weight to the cover. As the size and shape of the pile changes, another segment of the attachment strip may be separated from the underlying panel to alter the point at which the weight is attached to the cover. A plurality of the panels include ripstops spaced at desired intervals along the panel to halt the propagation of rips which may form in the panel.

More specifically, the present invention contemplates a protective cover for protecting a pile or mound of particulate material, such as salt or sand while the latter is in outside storage, so that the material is not contaminated, eroded or dispersed by the wind and rain.

The cover includes a plurality of elongated panels that are adapted to overlie the pile and are arranged to extend lengthwise between the apex and perimeter of the base of the pile. The panels comprising the cover are connected together along their side edges by seams that extend substantially perpendicularly to the perimeter of the cover and the base of the pile. At least one strap is secured to and extends along the length of at least one of the panels. At a desired location on the cover, a segment of the strap is separated from the underlying panel to establish a loop to permit a weight, such as a sand bag or plurality of sand bags, to be retained on the outer surface of the cover.

According to the present invention, the panels of the cover in one embodiment of the cover are formed from materials of different porosity, namely canvas and polyethylene. In other embodiments, each panel of the cover is formed from non-porous material such as polyethylene, or each panel of the cover is formed from porous material such as canvas. The panels which are constructed of a material having a propensity to rip from the action of the wind include ripstops. The ripstops extend transversely across the panel and are spaced from each other by a desired distance to prevent a rip from propagating along the length of the panel for a distance which exceeds the spacing of the ripstops.

BRIEF DESCRIPTION OF THE DRAWINGS

FIG. 1 is a top plan view of a protective cover embodying the features of the present invention and showing the invention as it would appear when installed on a pile of flowable, particulate material, such as salt;

FIG. 2 is an enlarged, broken fragmentary sectional view taken along the line 2—2 of FIG. 1;

DETAILED DESCRIPTION OF THE PREFERRED EMBODIMENT

Figure 3:
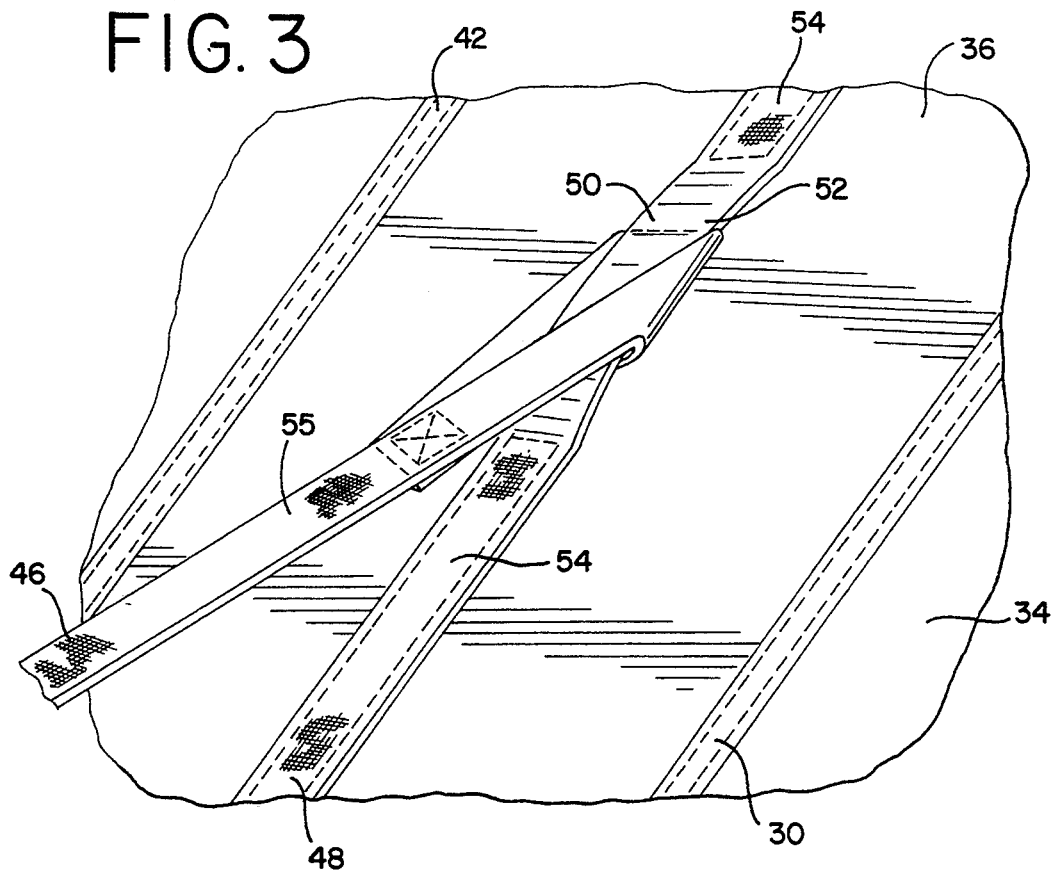
FIG. 3 is an enlarged, fragmentary perspective view of a portion of one of the panels of the cover of FIG. 1.

In FIG. 1, a protective cover embodying the features of the present invention is illustrated and indicated generally at 10. The cover 10, in the present instance, is shown as it would appear when operatively engaged with an elongated pile 12 or mound of flowable, particulate material, having an apex 14 and a base 16 which is generally oval in plan. Sides 18 of the pile 12 slope downwardly and outwardly from the elongated apex 14 toward the perimeter 20 of the base 16 at angles corresponding to the angle of repose of the material of the pile. The outer surfaces of the ends of the pile 12 likewise slope downwardly from the ends of the apex 14 toward the perimeter 20 in the manner of the outer surface of a vertically truncated cone.

The cover 10 includes a central portion 22 and left and right end portions 24 and 26, respectively, as viewed in FIG. 1, which rest on and assume the shapes of the sides 18 and ends of the pile 12. The central portion 22 is formed by a plurality of elongated panels 28, which are arranged so as to extend lengthwise between the apex 14 and perimeter 20 of the pile 12. The panels are connected at seams 30 extending along the adjoining side edges of the panels. The panels 28 and seams 30 extend substantially perpendicular to a margin 32 substantially coextensive with the perimeter 20 of the base 16.

Figure 4:
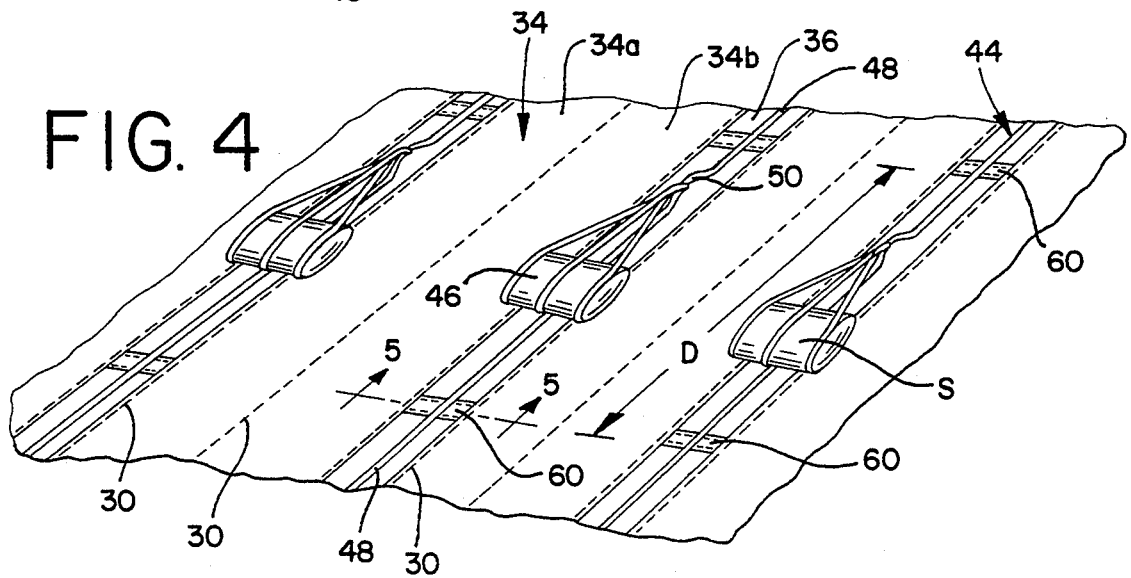
FIG. 4 is an enlarged, fragmentary perspective view of a portion of one side of the cover of FIG. 1.

The panels 28 of the central portion 22 of one embodiment of cover 10 are preferably of two different widths and materials, and referring to FIG. 4, include a plurality of panels 34a, which are of a material that is substantially nonporous to gas and liquid, such as polyethylene plastic, and a plurality of panels 36b which are porous to gas and substantially nonporous to liquids, such as canvas. The panels are joined to each other along lengthwise seams 30. The polyethylene panels 34 in this embodiment are preferably about 6 ft. wide. The canvas panels 36 are preferably about 2.5 ft. wide and are formed by folding lengthwise a length of canvas fabric 5 ft. wide so that the thickness of the canvas panel is twice the thickness of the canvas fabric. The plastic panels 34 and canvas panels 36 are preferably attached to each other in a repeating pattern whereby two plastic panels are located between bordering canvas panels.

Referring to FIG. 1, in the first embodiment the left and right end portions 24 and 26 of the cover 10 are likewise formed by a plurality of plastic and canvas panels 34 and 36 connected to each other at seams 30. However, in the left and right end portions 24, 26, the panels 34, 36 are cut or otherwise formed into pie-shaped sections. The panels in each of the end portions 24, 26 are preferably arranged in the same manner as the plastic and canvas panels 34 and 36 of the central portion 22, i.e. they extend substantially lengthwise between the apex 14 and perimeter 20 of the pile 12, and so that the seams 30 between the panels extend generally perpendicular to the margin 32 of the cover, and there are two plastic panels between bordering canvas panels. The end portion 24 is connected to the longitudinally outermost panels of the central portion 22 along end seam 38, and the end portion 26 is connected to the central portion along end seam 40.

As previously described, the panels 34 and 36 of the central portion 22 and end portions 24 and 26 of the cover 10 are connected together along their side edges by the seams 30, and the end portions 24, 26 are connected to the central portion along end seams 38 and 40 respectively. These connections are preferably made by sewing the seams 30, 38 and 40 together at the site where the cover 10 is to be installed. Seams 30 and end seams 38, 40 are preferably reinforced by sewing or otherwise securing strips of reinforcing material such as lengths of canvas strapping or webbing 42 (FIG. 3), to the seams 38, 40.

Referring to FIG. 4, in order to minimize the possibility of separation of the cover 10 from the underlying pile 12 of material due to aerodynamic lift, the cover includes securing means 44 for securing a plurality of ballast weights 46 at desired locations on the upper surface of the cover. The ballast weight securing means 44 include weight attaching and retaining means in the form of a plurality of lengths of attachment strips 48 of cloth webbing or tape. Preferably, the attachment strips 48 extend lengthwise along the entire length of each of the canvas panels 36 in the central portion 22 (FIG. 1), between and generally equidistant from the seams 30 connecting the canvas panels 36 to the plastic panels 34 in this embodiment. Each attachment strip 48 is preferably attached or fastened to the underlying canvas panel 36 along the entire length of the strip.

Referring to FIG. 3, a weight attachment loop 50 is formed or established in each attachment strip 48 by separating a segment 52 of the attachment strip from the underlying canvas panel 36. However, the attachment strip 48 is fastened to the underlying panel 36 so that if the segment 52 of the strip is separated from the underlying panel to form the attachment loop 50, and the ballast weight 46 is connected to the loop as described below, bordering portions 54 of the strip will remain fastened to the underlying panel, and the size of the loop will not increase. The attachment strip 48 may be fastened to the canvas panel 36 by lock type stitching or other suitable means.

Thus, a user may separate a segment 52 to establish the attachment loop 50 at a desired location. A ballast weight 46 having a hanging strip 55 is attached to the cover 10 by tying the hanging strip to the attachment strip 48. While different types of ballast weights 46 can be used for this purpose, a plurality of sand filled bags, some of which are indicated at S in FIG. 4, are well suited for this purpose.

It should be understood that a plurality of the weight retaining strips or webbing 48 and ballast weights 46 could extend along the canvas panels 36 of the end portions 24, 26, if desired, to counteract effects of aerodynamic lift on the end portions.

Referring to FIG. 2, to prevent the cover 10 from being displaced by the wind and folded back upon itself so that wind gets beneath the cover, the cover 10 is provided with a skirt 56, which extends outwardly from the margin 32 and perimeter 20 of the pile 12. Ballast material, such as a layer of pebbles or crushed rock, indicated at 58, is applied to the upper surface of the outer skirt 56 to prevent displacement of the cover 10 as a result of high winds and/or gusts.

Referring to FIG. 1, the wind, however, may be able to get beneath cover 10 through an opening, such as an opening used for removal of the particulate matter from beneath the cover. The wind becomes trapped beneath the cover 10 and exerts stress on the panels 28 of the cover. The canvas panels 36 of the cover 10 of the first embodiment breathe to allow the wind to escape from beneath the cover. If the wind is too strong, a rip will form in one or more of the canvas panels 36 through which the wind escapes. Rips in the canvas panels 36 may propagate along the entire length of the panel. Also, if the stress caused by the wind is sufficient, rips may occur and propogate in the polyethylene panels 34.

Referring to FIG. 4, to limit the propagation of a rip, the canvas panels 36 each include at least one ripstop 60.

Figure 5:
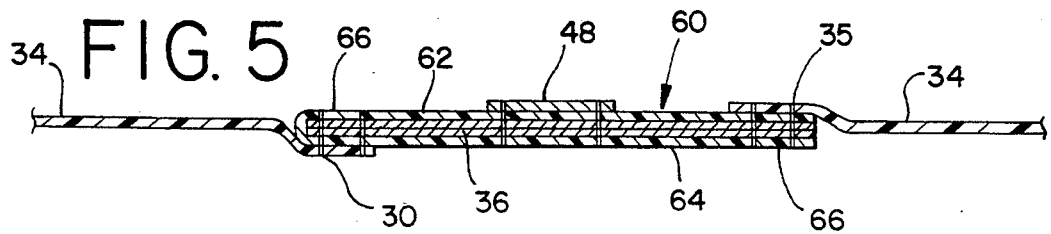
FIG. 5 is an enlarged, sectional view, taken substantially along the line 5—5 of FIG. 4.

Each of the ripstops 60 extend transverse or horizontally across the width of the canvas panel 36 generally perpendicular to the seams 30. Referring to FIG. 5, before the canvas panel 36 and the adjoining plastic panels 34 are attached to each other along seam 30, the ripstop 60 is formed by folding over a length of material to sandwich the canvas panel 36 between an upper layer 62 and a lower layer 64. The lateral end portions 66 of the ripstop 60 are attached to the plastic and canvas panels 34, 36 when the seams 30 are formed. Both the upper layer 62 and lower layer 64 of the ripstop 60 are attached to the panel 34 preferably by lines of stitching extending from one end portion 66 of the ripstop to the other end portion horizontally along the length of the ripstop. If deemed desirable, ripstops 60 can similarly be attached across the width of each of the polyethylene panels 34a, b at selected locations.

Referring to FIG. 4, to control the length of a rip in a canvas panel 36 so that the rip will provide a sufficient exit for the wind and yet not extend over too great a length thus increasing repair costs, the ripstops 60 are separated from each other on the canvas panel 36 by a desired distance "D". In a preferred embodiment, the ripstops 60 on each of the canvas panels 36 are separated by a distance of forty feet.

Each ripstop 60 is preferably made of 18 oz. vinyl coated nylon and is approximately ten inches in width. The attachment strip 48 preferably overlays the upper layer 62 of the ripstops to allow the formation of the attachment loop 50 anywhere along the length of the attachment strip, even at or adjacent the ripstop 60.

In operation, the cover 10 is formed of sufficient size and shape to overlay the pile 12 so that the skirt 56 contacts the ground about the perimeter of the pile 12. On each of the attachment strips 48, the attachment loop 50 is formed at a desired location by separating the segment 52 of the attachment strip from the underlying canvas panel 36. The separation may be made by cutting the stitching attaching the strip 48 to the panel 36 or by any other suitable method. The hanging strip 55 of the ballast weight 46 is then attached, preferably by tying the hanging strip to the segment 52 forming part of the attachment loop 50.

During removal of particulate matter from the pile the shape of the pile changes until the attachment loop 50 of one or more of the attachment strips 48 is too close to the ground, and one or more ballast weights 46 rest on the ground. Another segment 52 of the strip may then be separated from the panel to form another, higher attachment loop 50 to which the ballast weight 46 is attached.

If stress exerted on the cover by the wind or other means causes a ripping of the canvas panels 36 in the abovedescribed embodiment, the ripstops 60 prevent the rip, so formed, from extending past the ripstop. The small rip thus formed may be easily repaired. A similar limiting of rips occurs when the ripstop 60 is attached to polyethylene panels 34.

In a second embodiment of the invention, referring to FIGS. 1–5 all panels 34a, 34b and 36 of the cover 10 are made of polyethylene material. Panels 34a, b are each approximately six feet wide. Panel 36 is approximately three feet wide, being formed by doubling over a six foot wide panel of polyethylene material. In this embodiment, the entire cover is non-porous to gas and liquid. Cloth webbing or tape attachment strips 48 extend along the length of polyethylene panels 36 and are attached to the doubled over polyethylene panel in the same manner as previously described. Additionally, ripstops 60 are secured across the width of only the doubled over polyethylene panel 36 at preselected locations, as illustrated in FIGS. 4 and 5. If desired, ripstops 60 can also be secured along the width of each of the panels 34 and 34b at pre-selected locations.

In a third embodiment of the invention, referring again to FIGS. 1–5, all panels 34a, 34b and 36 of the cover 10 are made of canvas material. Panels 34a and 34b are each approximately five feet wide. Panel 36 is approximately two and a half feet wide, being formed by doubling over five foot wide panel of canvas material. In this embodiment, the entire cover is porous to gas and non-porous to liquid. Cloth webbing or tape attachment strips 48 extend along the length of canvas panels 36 and are attached to the doubled over canvas panel in the same manner as previously described. Additionally, ripstops 60 are secured across the width of each doubled over canvas panel 36 at preselected locations, as illustrated in FIGS. 4 and 5. If desired, ripstop 60 can also be secured along the width of each of the canvas panels 34a and 34b at pre-selected locations.

Specific embodiments of the novel cover for a pile of particulate matter according to the present invention have been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

I claim:

1. A protective cover for a pile of particulate material having an apex and a base and sides sloping downwardly and outwardly from said apex toward the perimeter of said base, said cover comprising:
   a plurality of elongated panels adapted to overlie said pile and extend lengthwise along the sloping sides of said pile, each of said panels having laterally spaced side edges joined together by seams, and
   an attachment strip extending along a portion of the length of at least one of said panels, said attachment strip being fastened to aid at least one panel generally along the length of said strip, a portion of said attachment strip being separated from said at least one panel to form an attachment loop adapted to engage and retain a ballast weight on said cover.

2. The protective cover of claim 1 wherein said panels include first panels and second panels joined together by said seams in an alternating pattern, said first panels being porous to gas and substantially non-porous to liquid and said second panels being substantially non-porous to both gas and liquid.

3. The protective cover of claim 1 wherein all said panels are substantially non-porous to both gas and liquid.

4. The protective cover of claim 1 wherein all said panels are porous to gas and are substantially non-porous to liquid.

5. The cover of claim 1 wherein said first panels are made of canvas and said second panels are made of plastic.

6. The cover of claim 1 wherein said attachment strip extends along said at least one panel generally equidistant from the side edges of said at least one panel.

7. The cover of claim 1 wherein said ballast weight includes a hanging strap adapted to be secured to said attachment loop to secure said ballast weight to said cover.

8. The cover of claim 1 wherein said attachment strip comprises a length of canvas strapping.

9. The cover of claim 1 further including ripstop means attached directly to and extending transversely across at least one of said panels for stopping rips from propagating past the ripstop means along said at least one panel when stress forces are applied to said cover, said attachment strip having portions extending over said ripstop means.

10. The cover of claim 1 wherein said at least one panel comprises a doubled over portion of material from which said panel is made.

11. The cover of claim 10 wherein said attachment strip is attached to said doubled over portion of materials.

12. A protective cover for a pile of particulate material having an apex and a base and sides sloping downwardly and outwardly from said apex toward the perimeter of said base, said cover comprising:

a plurality of elongated panels adapted to overlie said pile and extend lengthwise along the sloping side of said panel, each of said panels having laterally spaced side edges joined together by seams; and ripstop means directly attached to and extending transversely across at least one of said panels for stopping the propagation of rips past the ripstop means along said at least one panel when stress forces are applied to said cover.

13. The cover of claim 12 wherein said at least one panel includes a plurality of said ripstop means disposed along the length thereof, said ripstop means being separated from each other by a pre-selected distance.

14. The protective cover of claim 12 wherein said panels include first panels and second panels joined together by said seams in an alternating pattern, said first panels being porous to gas and substantially non-porous to liquid and said second panels being substantially non-porous to both gas and liquid.

15. The protective cover of claim 12 wherein all said panels are substantially non-porous to both gas and liquid.

16. The protective cover of claim 12 wherein all said panels are porous to gas and are substantially non-porous to liquid.

17. The cover of claim 12 wherein said strip of ripstop material comprises an upper layer and a lower layer, said at least one panel being sandwiched between said upper layer and said lower layer.

18. The cover of claim 17 wherein said at least one panel comprises a doubled over portion of material from which said panel is made.

* * * * *